US012750732B2

(12) United States Patent
Li

(10) Patent No.: US 12,750,732 B2
(45) Date of Patent: Sep. 29, 2026

(54) CONSTRUCTION METHOD FOR DATA OFFLOADING SYSTEM, NETWORK DEVICE, AND STORAGE MEDIUM

(71) Applicant: ZTE CORPORATION, Shenzhen (CN)

(72) Inventor: Xiaodi Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 28 days.

(21) Appl. No.: 18/878,281

(22) PCT Filed: May 12, 2023

(86) PCT No.: PCT/CN2023/093898
§ 371 (c)(1),
(2) Date: Dec. 23, 2024

(87) PCT Pub. No.: WO2024/001561
PCT Pub. Date: Jan. 4, 2024

(65) Prior Publication Data

US 2025/0386247 A1 Dec. 18, 2025

(30) Foreign Application Priority Data

Jun. 27, 2022 (CN) ........................ 202210736261.4

(51) Int. Cl.
*H04W 28/088* (2023.01)
*H04L 47/2441* (2022.01)
*H04W 16/10* (2009.01)

(52) U.S. Cl.
CPC ....... *H04W 28/088* (2023.05); *H04L 47/2441* (2013.01); *H04W 16/10* (2013.01)

(58) Field of Classification Search
CPC ... H04W 28/088; H04W 76/12; H04W 16/10; H04W 28/10; H04L 47/2441; H04L 45/74
See application file for complete search history.

(56) References Cited

U.S. PATENT DOCUMENTS

2019/0215724 A1* 7/2019 Talebi Fard .......... H04W 48/16
2020/0287975 A1* 9/2020 Li ........................ H04L 67/146
(Continued)

FOREIGN PATENT DOCUMENTS

CN 113395711 A 9/2021
CN 113993118 A 1/2022

OTHER PUBLICATIONS

3GPP Technical Specification Group Radio Access Network. "Determine the information for ECS option from multiple candidate DNAIs" 3GPP TSG-WG SA2 Meeting #146E, Aug. 16-27, 2021, pp. 1-7.

(Continued)

*Primary Examiner* — Tonia L Dollinger
*Assistant Examiner* — Joseph M Cousins
(74) *Attorney, Agent, or Firm* — Vivacqua Crane, PLLC

(57) ABSTRACT

The present application provides a construction method for a data offloading system. The method may include: acquiring a candidate service offloading rule sent by a PCF, and determining, according to a DNAI, a target service offloading rule from the candidate service offloading rule; constructing a service detection rule according to the target service offloading rule; determining a target central UPF according to the target service offloading rule, generating an establishment request according to the service detection rule, and sending the establishment request to the target central UPF, wherein the target central UPF is configured to identify a UE access packet according to the service detection rule, and in response to a detection result of the UE access packet satisfying a preset condition, cache the UE access packet and send an offloading instruction to the SMF; and constructing a UPF resource-based data offloading system according to the offloading instruction.

20 Claims, 7 Drawing Sheets

(56) References Cited

U.S. PATENT DOCUMENTS

| | | | | |
|---|---|---|---|---|
| 2021/0377838 | A1 | 12/2021 | Ali et al. | |
| 2022/0311680 | A1 * | 9/2022 | Huang | H04L 12/66 |

OTHER PUBLICATIONS

International Searching Authority. International Search Report and Written Opinion for PCT Application No. PCT/CN2023/093898 and English translation, mailed Aug. 2, 2023, pp. 1-10.

* cited by examiner

CONSTRUCTION METHOD FOR DATA OFFLOADING SYSTEM, NETWORK DEVICE, AND STORAGE MEDIUM

CROSS-REFERENCE TO RELATED APPLICATION

This application is a national stage filing under 35 U.S.C. § 371 of international application number PCT/CN20239/093898, filed May 12, 2023, which claims priority to Chinese patent application No. 202210736261.4 filed on Jun. 27, 2022. The contents of these applications are incorporated herein by reference in their entirety.

TECHNICAL FIELD

The present disclosure relates to the field of communication technologies, particularly to a method for constructing a data offloading system, a network device, and a storage medium.

BACKGROUND

In an existing 5G mobile communication system, when a user goes online using a terminal device, a policy control function (PCF) sends an offloading rule to a session management function (SMF) according to a subscription plan of the user. The SMF establishes a user plane function (UPF)-based offloading system according to the offloading rule delivered by the PCF, to implement subsequent data exchange between the user terminal and a dedicated network. However, since the user may not immediately choose to perform data exchange with the dedicated network (that is, a dedicated network access service occurs) after going online using the terminal device, the offloading system is idle, which leads to low utilization and waste of UPF resources.

SUMMARY

The following is a summary of the subject matters described in detail herein. This summary is not intended to limit the scope of protection of the claims.

Embodiments of the present disclosure provide a method for constructing a data offloading system, a network device, and a storage medium.

In accordance with a first aspect of the present disclosure, an embodiment provides a method applied to an SMF for constructing a data offloading system, and the method may include: acquiring a candidate service offloading rule sent by a PCF, determining, according to a data network access identifier (DNAI), a target service offloading rule from the candidate service offloading rule; constructing a service detection rule according to the target service offloading rule; determining a target central UPF according to the target service offloading rule, generating an establishment request according to the service detection rule, and sending the establishment request to the target central UPF, where the target central UPF is configured to detect a user equipment (UE) access packet according to the service detection rule, and when a detection result of the UE access packet satisfies a preset condition, the target central UPF is configured to cache the UE access packet and send an offloading instruction to the SMF; and constructing a UPF resource-based data offloading system according to the offloading instruction.

In accordance with a second aspect of the present disclosure, an embodiment further provides a method applied to a target central UPF for constructing a data offloading system, and the method may include: receiving an establishment request from an SMF, where the SMF is configured to acquire a candidate service offloading rule sent by a PCF, determine, according to a DNAI, a target service offloading rule from the candidate service offloading rule, construct a service detection rule according to the target service offloading rule, and generate an establishment request according to the service detection rule; and detecting a UE access packet according to the service detection rule, and when a detection result of the UE access packet satisfies a preset condition, caching the UE access packet and sending an offloading instruction to the SMF.

In accordance with a third aspect of the present disclosure, an embodiment further provides a network device, which may include a memory and a processor, where the memory stores a computer program which, when executed by the processor, causes the processor to perform the method of the first aspect and/or the method of the second aspect.

In accordance with a fourth aspect of the present disclosure, an embodiment further provides a computer-readable storage medium storing a program which, when executed by a processor, causes the processor to perform the method of the first aspect and/or the method of the second aspect.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims, and the accompanying drawings.

BRIEF DESCRIPTION OF DRAWINGS

The accompanying drawings are provided for an understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

Figure 1:
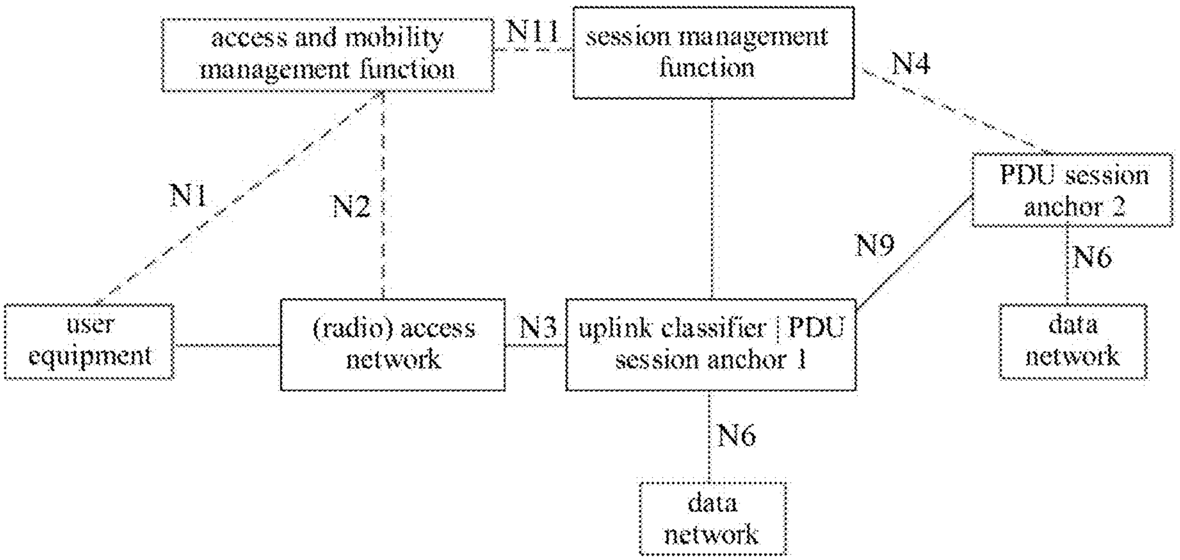
FIG. 1 is a schematic diagram of a network architecture in a roaming scenario according to an embodiment of the present disclosure.

In order to make the objectives, technical schemes and advantages of the present disclosure more apparent, the present disclosure is described in detail in conjunction with the accompanying drawings and embodiments. It should be understood that the particular embodiments described herein are only intended to explain the present disclosure, and are not intended to limit the present disclosure.

In the description of the present disclosure, it should be understood that, descriptions relating to orientation, for example, orientation or positional relationships indicated by "up", "down", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

It should be noted that although a functional module division is shown in a schematic diagram of an apparatus and a logical order is shown in a flowchart, the steps shown or described may be executed, in some cases, with a different module division from that of the apparatus or in a different order from that in the flowchart. The terms such as "first" and "second" in the description, claims or above-mentioned drawings are intended to distinguish between similar objects and are not necessarily to describe a specific order or sequence. In description of this application, unless otherwise stated, "plurality" means two or more than two.

In the description of the present disclosure, it is to be noted that unless otherwise explicitly defined, the terms such as "install", and "connect" should be understood in a broad sense, and those having ordinary skill in the art can determine the specific meanings of the above words in the present disclosure in a rational way in conjunction with the specific contents of the technical schemes.

In the field of 5G communication, UPF is an important part of a network system architecture and is mainly responsible for routing and forwarding of user-plane data packets in a 5G core network. In an existing technology, in a position-independent offloading scenario in communication between a user terminal and a dedicated network, since there is no connection and no positional relationship between a dedicated network UPF and a base station, when a user is online, a PCF sends an offloading rule to an SMF according to a subscription plan of the user, and the SMF selects the dedicated network UPF according to the offloading rule delivered by the PCF. Therefore, this forms an offloading system in which an Uplink Classifier (ULCL) UPF and a primary protocol data unit (PDU) session anchor (PSA) are integrated, with a secondary anchor point inserted afterward. However, because there is no offloading service for a period of time after the user goes online, the offloading system is idle in the above establishment method, which leads to the waste of UPF resources and lowers the effective utilization of UPF.

At present, there is a method for triggering offloading by a change in a user's position. Different DN Access Identifiers (DNAIs) are mapped according to the user's position, and the ULCL is inserted to realize offloading. Alternatively, offloading is triggered by a network-side PCF. However, such processing has the following defects:

1. For the position-independent dedicated network UPF, an insertion timing of the secondary anchor point cannot be decided according to the user's position movement, that is, UPF re-selection cannot be triggered according to a mapping relationship between the position and DNAI.
2. A network side initiates a service update, the PCF delivers a new offloading policy, and the SMF immediately executes offloading, resulting in a waste of UPF resources.
3. When the user moves to a new location, where an original central UPF cannot cover, the ULCL has to be inserted forward, and it is inevitable to pre-select the UPF resource. On the contrary, if the original central UPF can cover the new area, the pre-selected UPF resource is a waste.

Based on this, embodiments of the present disclosure provide a method for constructing a data offloading system, a network device, and a storage medium, which can improve the utilization of UPF resources.

A terminal device in the embodiments of the present disclosure may be a smart phone, a tablet computer, a laptop computer, a desktop computer, a smart speaker, a smart watch, a vehicle on-board terminal, etc., but is not limited thereto.

FIG. 1 is a schematic diagram of a network architecture according to an embodiment of the present disclosure. The network architecture represents a case in which a ULCL UPF and a primary PSA (PDU session anchor 1 in FIG. 1) are integrated in a position-independent offloading scenario which is involved in communication between a user terminal and a dedicated network in a non-roaming scenario. In an embodiment, the network architecture includes a UE, a (radio) access network ((R)AN), an access and mobility management function (AMF), an SMF, a secondary anchor UFP (PDU session anchor 2 in FIG. 1), and a data network (DN).

Figure 2:
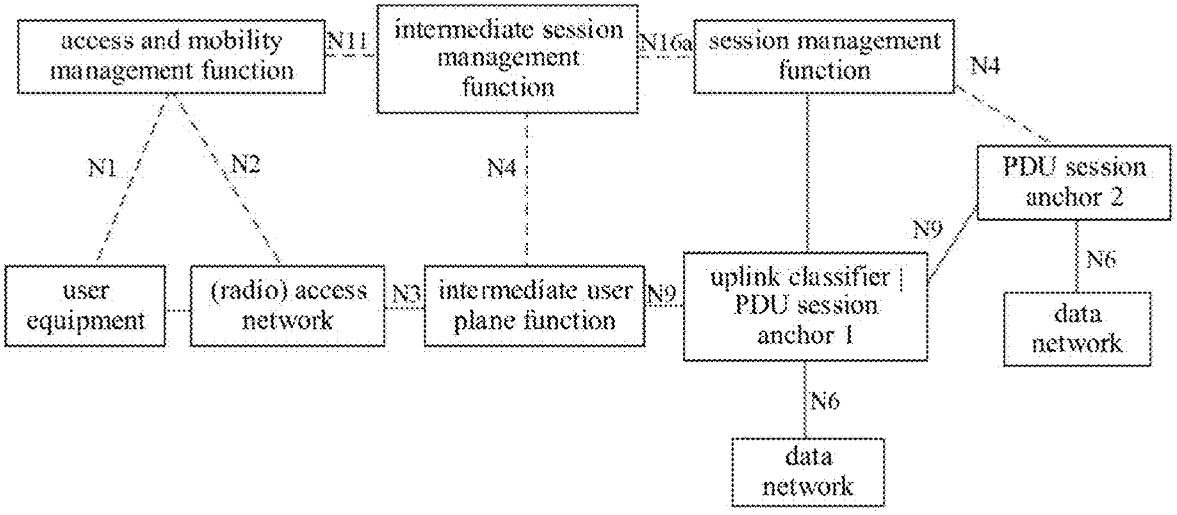
FIG. 2 is a schematic diagram of a network architecture in a non-roaming scenario according to an embodiment of the present disclosure.

FIG. 2 is a schematic diagram of a network architecture according to another embodiment of the present disclosure. The network architecture represents a case in which a ULCL UPF and a primary PSA (PDU session anchor 1 in FIG. 1) are integrated in a position-independent offloading scenario which is involved in communication between a user terminal and a dedicated network in a roaming scenario. As compared with FIG. 1, the network architecture in this case further includes an intermediate or visited SMF (I/V-SMF) and an intermediate or visited UPF (I/V-UPF).

Figure 3:
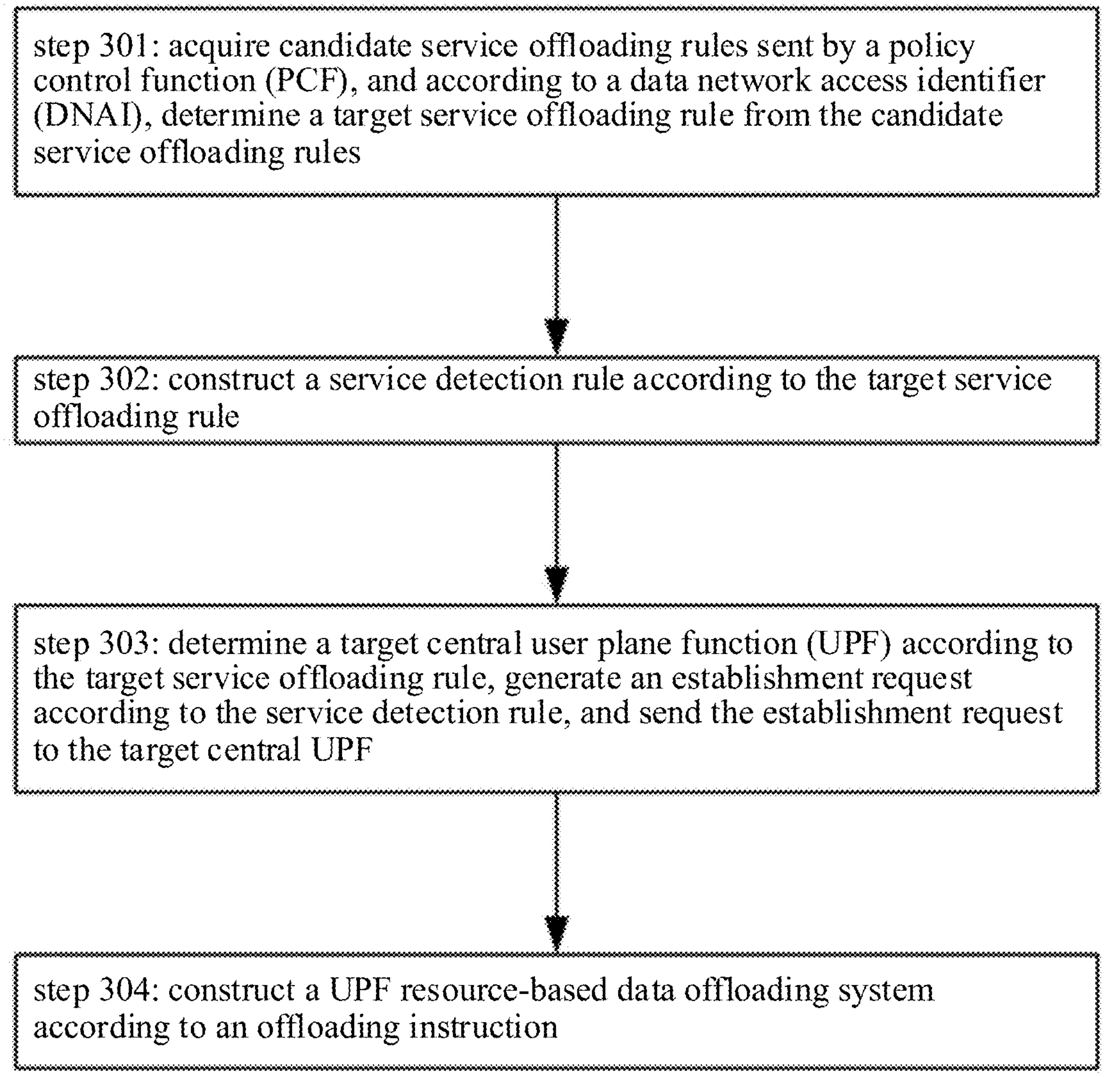
FIG. 3 is a flowchart of a method for constructing a data offloading system applied to an SMF according to an embodiment of the present disclosure.

Based on the network architecture shown in FIG. 1 or FIG. 2, refer to FIG. 3, which is a flowchart of a method for constructing a data offloading system applied to an SMF according to an embodiment of the present disclosure. The method includes, but is not limited to, the following steps 301 to 304.

At step 301, candidate service offloading rules sent by a PCF are acquired, and according to a DNAI, a target service offloading rule is determined from the candidate service offloading rules.

At step 302, a service detection rule is constructed according to the target service offloading rule.

At step 303, a target central UPF is determined according to the target service offloading rule, an establishment request is generated according to the service detection rule, and then the establishment request is sent to the target central UPF. The target central UPF is configured to identify a UE access packet according to the service detection rule, and cache the UE access packet and send an offloading instruction to the SMF when a detection result of the UE access packet satisfies a preset condition.

At step 304, a UPF resource-based data offloading system is constructed according to the offloading instruction.

Here, the target service offloading rule determined according to the DNAI is an offloading rule used in a position-independent offloading scenario, which may also be referred to as a position-independent offloading rule in this specification. The target central UPF installs the service detection rule according to the establishment request to identify a UE access packet satisfying the condition according to the service detection rule, and generates the offloading instruction according to the UE access packet satisfying the condition, to cause the SMF to construct a UPF resource-based data offloading system. Compared with an existing technology in which the SMF establishes a UPF-based data offloading system once a user goes online, the present disclosure can control an establishment timing of the UPF-based data offloading system according to the access packet after the user goes online, which reduces the occurrence of idle UPF resources, and further improves the utilization of the UPF resources.

It should be noted that, in some embodiments, the target service offloading rule includes the DNAI, and the target central UPF is determined according to the user's position and the DNAI supported by the target central UPF.

It should be noted that, in some embodiments, the establishment request message includes not only the service detection rule, but also some other rules that need to be installed by the target central UPF.

In an embodiment, in the above step 302, the constructing a service detection rule according to the target service offloading rule may include: determining a reference packet data network (PDN) address carried by a service data flow (SDF) in the target service offloading rule; and constructing the service detection rule according to the reference PDN address.

In an embodiment, the data offloading system includes an ULCL UPF and a secondary anchor point UPF. In the above step 304, the constructing a UPF resource-based data offloading system according to the offloading instruction may include: acquiring a target DNAI from the target service offloading rule according to the offloading instruction; determining the secondary anchor point UPF according to the target DNAI; sending a first user plane update request configured to update the target central UPF to the ULCL UPF to the target central UPF, and controlling the target central UPF to send the UE access packet to the secondary anchor point UPF; and sending a second user plane update request configured to direct a downlink of the secondary anchor point UPF to the ULCL UPF to the secondary anchor point UPF.

In an embodiment, in the above step 301, the acquiring candidate service offloading rules sent by a PCF may include: sending a policy acquisition request to the PCF, and receiving the candidate service offloading rules sent by the PCF according to the policy acquisition request; or receiving a policy update message from the PCF, where the policy update message carries the candidate service offloading rules.

In an embodiment, the method for constructing a data offloading system further includes a following step.

At step 305, an offloading rule installation message is sent to a UE, where the offloading rule installation message carries the target service offloading rule; alternatively, the offloading rule installation message is sent to an I-SMF and/or a V-SMF so that the I-SMF and/or the V-SMF forward(s) the offloading rule installation message to the UE, where the offloading rule installation message carries the target service offloading rule.

Figure 4:
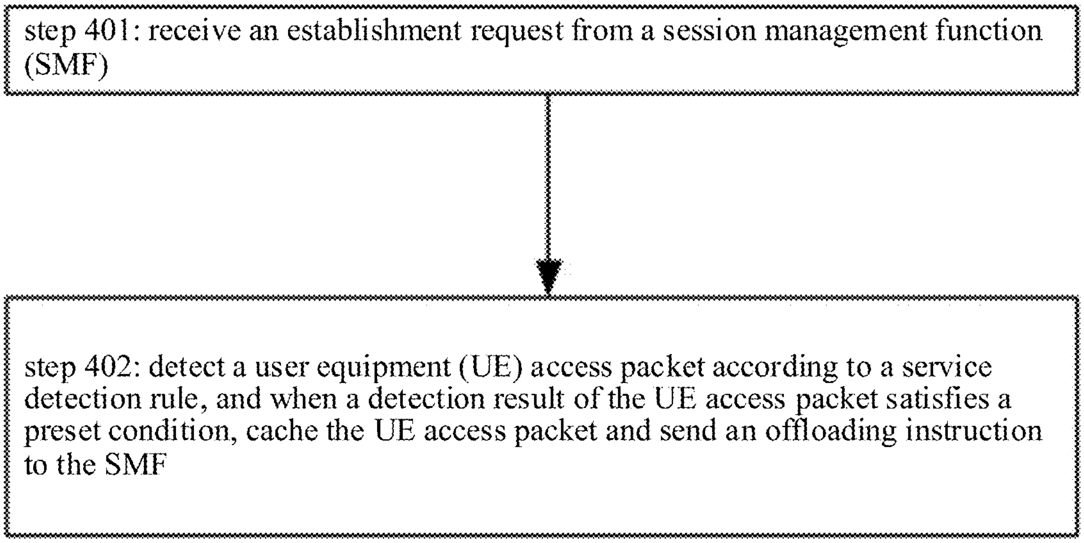
FIG. 4 is a flowchart of a method for constructing a data offloading system applied to a target central UPF according to an embodiment of the present disclosure.

Based on the network architecture shown in FIG. 1 or FIG. 2, refer to FIG. 4, which is a flowchart of a method for constructing a data offloading system applied to a target central UPF according to an embodiment of the present disclosure. The method includes, but is not limited to, the following steps 401 and 402.

At step 401, an establishment request is received from an SMF configured to acquire candidate service offloading rules sent by a PCF, determine a target service offloading rule from the candidate service offloading rules according to a DNAI, construct a service detection rule according to the target service offloading rule, and generate an establishment request according to the service detection rule.

At step 402, a UE access packet is detected according to the service detection rule, and when a detection result of the UE access packet satisfies a preset condition, the UE access packet is cached and an offloading instruction is sent to the SMF.

In an embodiment, in the above step 402, the detecting a UE access packet according to the service detection rule, and caching the UE access packet and sending an offloading instruction to the SMF when a detection result of the UE access packet satisfies a preset condition may include: determining a destination PDN address in the UE access packet; and when the destination PDN address successfully matches a reference PDN address carried by the SDF in the target service offloading rule, caching the UE access packet and sending the offloading instruction to the SMF.

It should be noted that when the destination PDN address successfully matches the reference PDN address carried by the SDF in the target service offloading rule, it means that communication needs to be performed between a user terminal and a dedicated network. In this case, the target central UPF sends the offloading instruction to the SMF so that the SMF constructs the offloading system. Therefore, in the present disclosure, the construction of the UPF resource-based offloading system is only triggered when there is a demand. That is, the embodiments of the present disclosure can identify the timing of creating the UPF resource-based offloading system through the target central UPF installed with the service detection rule, thereby realizing the construction of the UPF resource-based offloading system to be triggered on demand. In this way, a probability of the UPF-based offloading system being idle is reduced in the embodiments of the present disclosure, enhancing the utilization of the UPF resources.

In an embodiment, the method for constructing a data offloading system applied to the target central UPF further includes a following step.

At step 403, a first user plane update request from the SMF is received, and the target central UPF is updated to a ULCL UPF according to the first user plane update request.

In an embodiment, the method for constructing a data offloading system applied to the target central UPF further includes a following step.

At step 404, the UE access packet is sent to a secondary anchor point UPF.

An implementation procedure of a method for constructing a data offloading system provided in the present disclosure will be described below by using embodiments.

Figure 5:
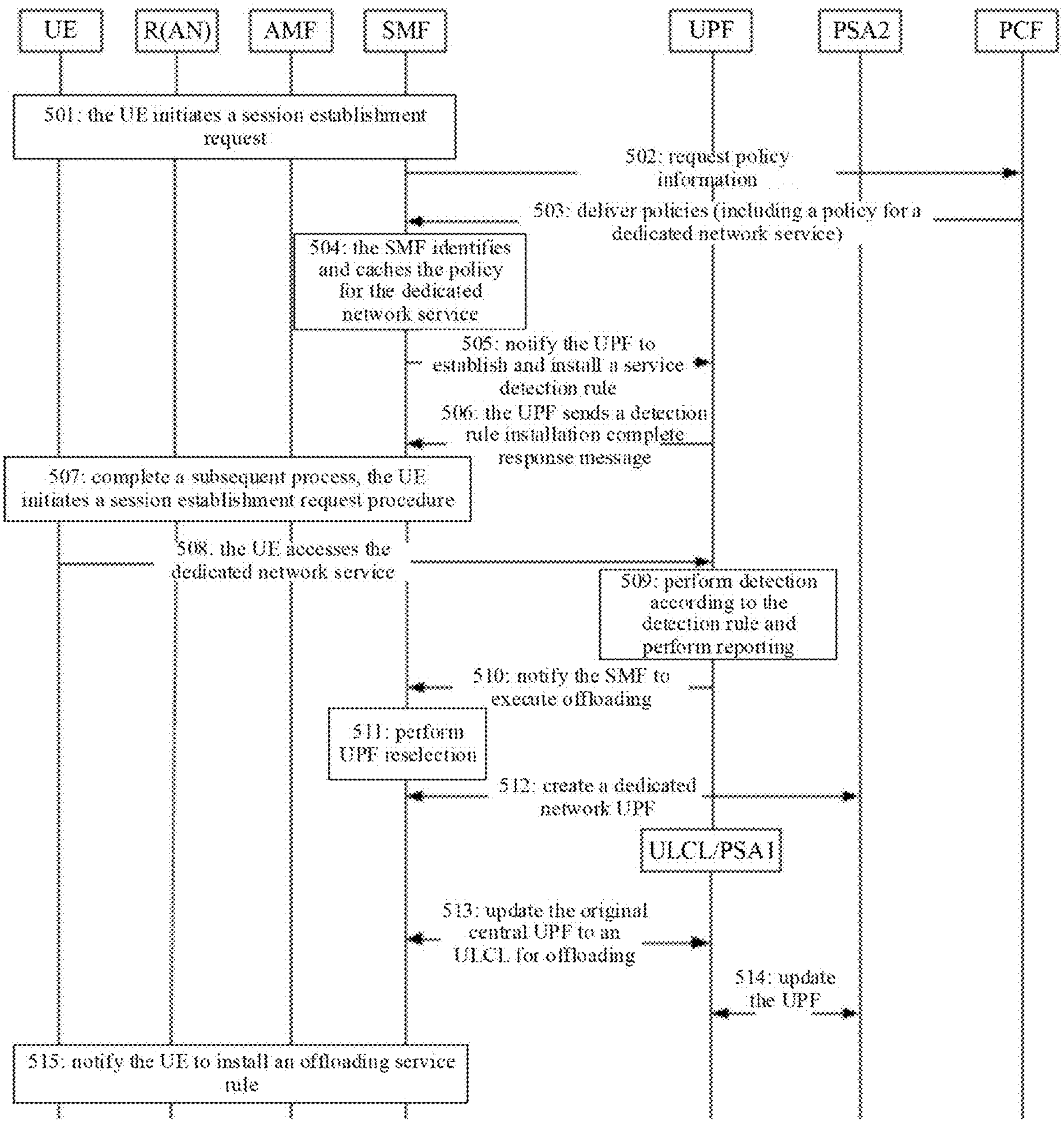
FIG. 5 is a sequence chart of a method for constructing a data offloading system in a non-roaming scenario according to an embodiment of the present disclosure.

As shown in FIG. 5, which illustrates an embodiment of creating a UPF-based offloading system when a user starts to go online in a non-roaming scenario, the embodiment includes but not limited to the following steps.

At step 501, the user initiates a session establishment request.

At step 502, an SMF sends a policy acquisition request to a PCF to request the PCF to deliver policy information.

At step 503, the PCF delivers policies, which include a related policy for accessing a dedicated network service, such as a target service offloading rule.

At step 504, the SMF receives the policies delivered by the PCF, and identifies the target service offloading rule (that is, a position-independent offloading rule) according to a DNAI of the candidate service offloading rules in the policies. Then, the SMF locally constructs a service detection rule according to the identified target service offloading rule. The constructed service detection rule can be configured to determine whether there is a dedicated network service in a user terminal packet. Here, a method for constructing the service detection rule includes: performing construction according to a reference PDN address carried by the SDF in the target service offloading rule.

At step 505, the SMF initiates a user plane establishment request carrying carries the service detection rule, and determines a target central UPF.

At step 506, the UPF sends an establishment complete response message to the SMF, and notifies the SMF of an installation result of the service detection rule and allocated resource information. The resource information may refer to N3 tunnel information between the ULCL UPF and the AN shown in FIG. 1.

At step 507, after a subsequent online process, the UE completes an online procedure.

At step 508, the user needs to access a dedicated network service.

At step 509, a packet of the user accessing the dedicated network reaches the target central UPF through a base station, and the target central UPF detects the UE access packet. When a destination PDN address successfully matches the reference PDN address carried by the SDF in the target service offloading rule, the UE access packet is cached and an offloading instruction is sent to the SMF. That is, in the present disclosure, the target central UPF can identify; according to the service detection rule, the packet for accessing the dedicated network service, report the packet satisfying a condition to the SMF, and cache the packet.

At step 510, the UPF reports to the SMF and notifies the SMF to execute an offloading policy.

At step 511, the SMF receives a reporting message from the UPF and re-selects a secondary anchor point UPF according to the previously cached target service offloading rule. A service requiring the insertion of a PSA (the secondary anchor point) for the dedicated network is identified according to the DNAI. In this case, the original UPF will have an uplink offloading ability.

At step 512, the SMF initiates a user plane establishment request, and notifies the dedicated network UPF to allocate relevant resources required by the user to install a rule related to the dedicated network service.

At step 513, the SMF initiates a first user plane update request to update the original target central UPF to the ULCL UPF to realize offloading, and forwards an offloading packet previously cached by the target central UPF to a PSA2 (PDU session anchor 2).

At step 514, the SMF initiates a second user plane update request, and the PSA2 directs downlink traffic to the ULCL.

At step 515, the UE is notified to install the target service offloading rule, and complete a subsequent process.

Figure 6:
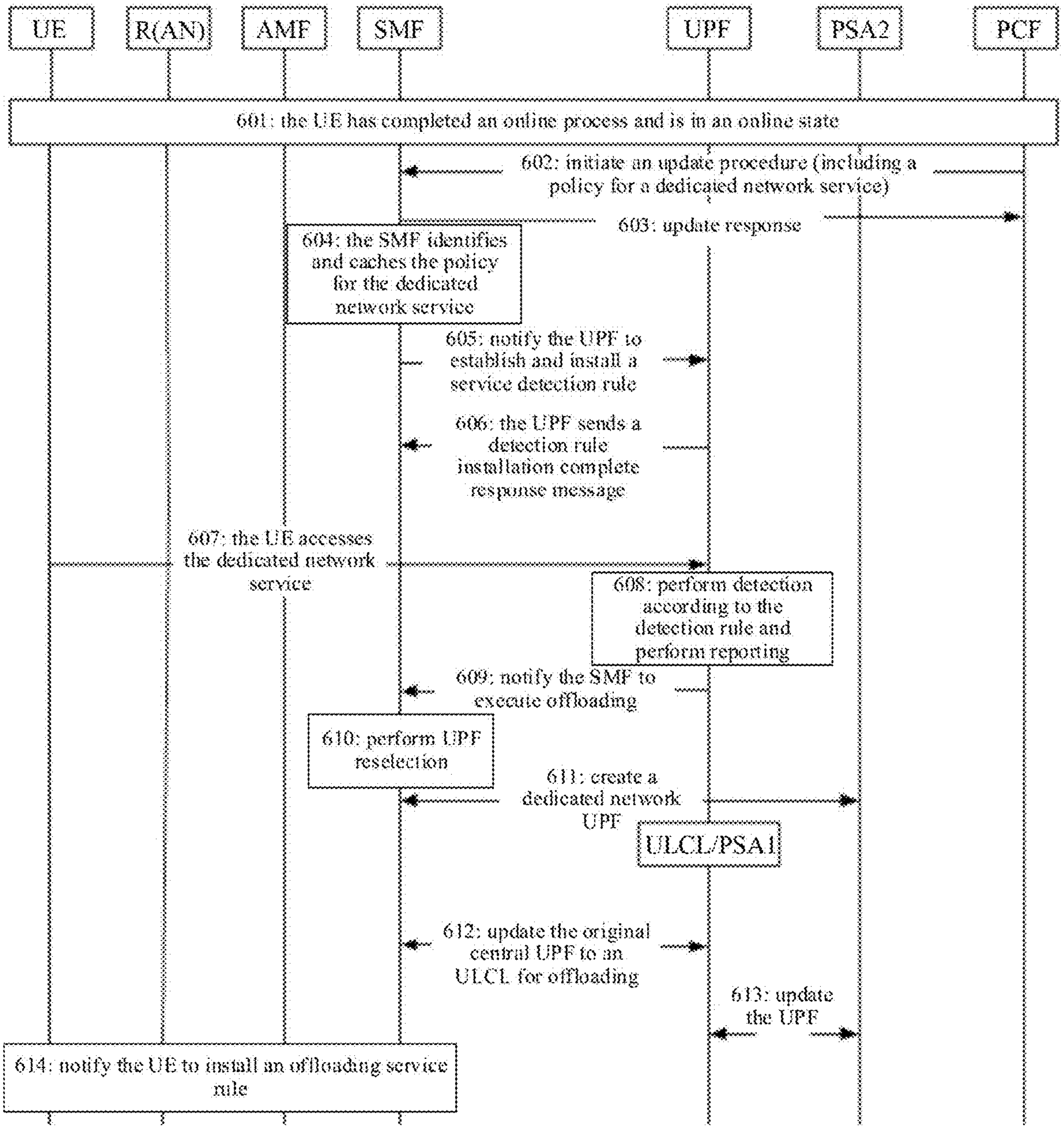
FIG. 6 is a timing diagram of a method for constructing a data offloading system in a non-roaming scenario according to another embodiment of the present disclosure.

As shown in FIG. 6, which illustrates an embodiment of creating a UPF-based offloading system when a user already goes online in a non-roaming scenario, the embodiment includes but not limited to the following steps.

At step 601, the user has completed an online procedure and is in an online state.

At step 602, a PCF initiates a reverse update procedure and delivers new policies (including a related policy for accessing a dedicated network service).

At step 603, an SMF sends a response message to the PCF.

At step 604, the SMF receives the policies delivered by the PCF, and identifies the target service offloading rule (that is, a position-independent offloading rule) according to the DNAI of candidate service offloading rules in the policies. Then, the SMF locally constructs a service detection rule according to the identified target service offloading rule. The constructed service detection rule can be configured to determine whether there is a dedicated network service in a user terminal packet. Here, a method for constructing the service detection rule includes: performing construction according to a reference PDN address carried by the SDF in the target service offloading rule.

At step 605, the SMF initiates a user plane establishment request carrying the service detection rule, and determines a target central UPF.

At step 606, the UPF sends an establishment complete response message to the SMF, and notifies the SMF of an installation result of the service detection rule and allocated resource information. The resource information may refer to N3 tunnel information between the ULCL UPF and the AN shown in FIG. 1.

At step 607, the user needs to access a dedicated network service.

At step 608, a packet of the user accessing a dedicated network reaches the target central UPF through a base station, and the target central UPF detects the UE access packet. When the destination PDN address successfully matches the reference PDN address carried by the SDF in the target service offloading rule, the UE access packet is cached and an offloading instruction is sent to the SMF. That is, in the present disclosure, the target central UPF can identify, according to the service detection rule, the packet for accessing the dedicated network service, report the packet satisfying the condition to the SMF, and cache the packet.

At step 609, the UPF reports to the SMF to indicate that the user has a request for the dedicated network service, and notifies the SMF to execute an offloading policy.

At step 610, the SMF receives a reporting message from the UPF and re-selects a secondary anchor point UPF according to the previously cached target service offloading rule. A service requiring the insertion of a PSA (the secondary anchor point) for the dedicated network is identified according to the DNAI. In this case, the original UPF will have an uplink offloading ability.

At step 611, the SMF initiates a user plane establishment request, and notifies the dedicated network UPF to allocate relevant resources required by the user to install an offloading rule.

At step 612, the SMF initiates a first user plane update request, updates the original target central UPF to the ULCL UPF to realize offloading, and forwards an offloading packet previously cached by the target central UPF to a PSA2 (PDU session anchor 2).

At step 613, the SMF initiates a second user plane update request, and the PSA2 directs downlink traffic to the ULCL.

At step 614, the UE is notified to install the offloading rule, and complete a subsequent process.

At this point, the SMF can apply for dedicated network UPF resources in real time according to the user's need.

Figure 7:
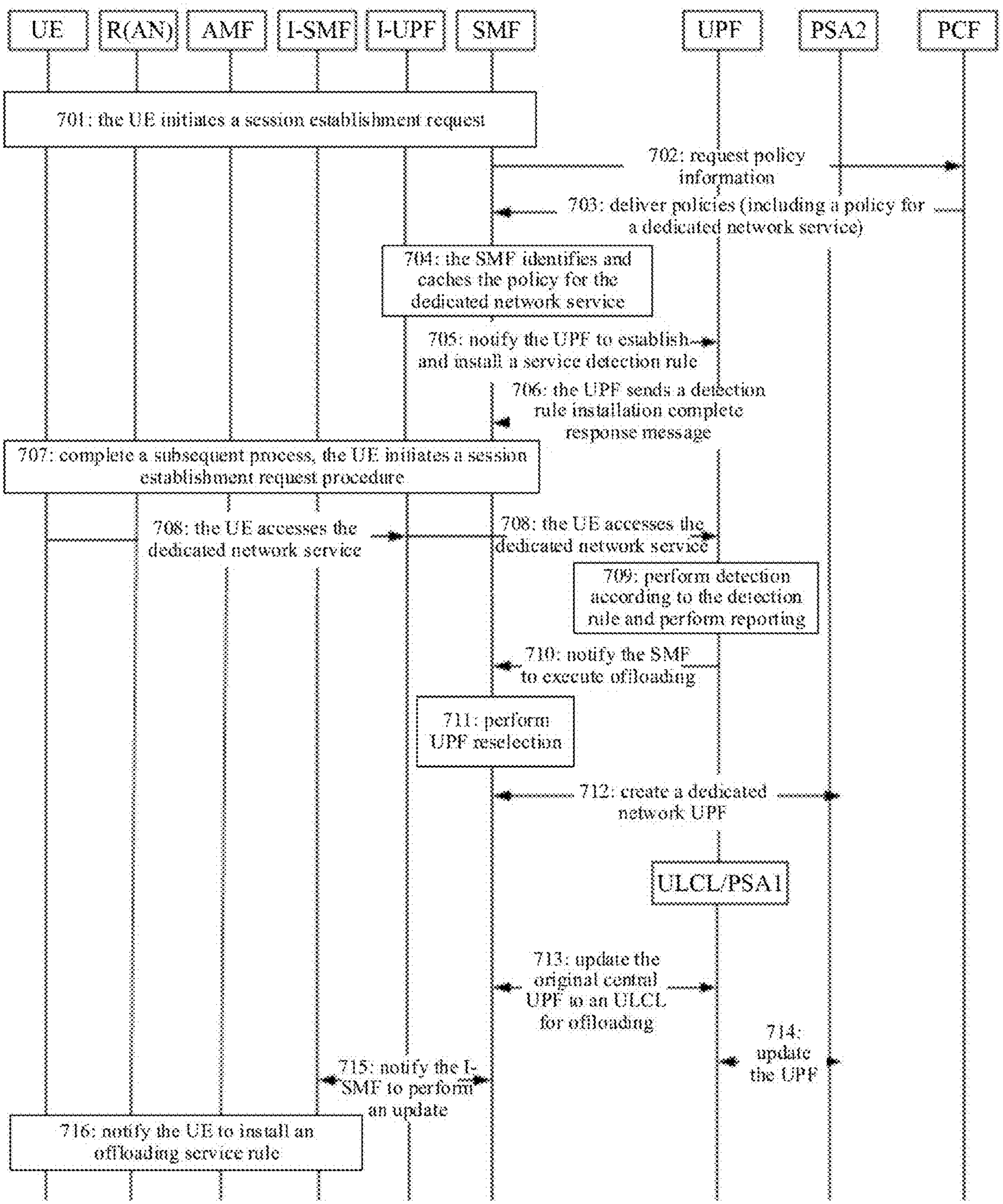
FIG. 7 is a sequence chart of a method for constructing a data offloading system in a roaming scenario according to an embodiment of the present disclosure.

As shown in FIG. 7, which illustrates an embodiment of creating a UPF-based offloading system when a user starts to go online in a roaming scenario, the embodiment includes but not limited to the following steps.

At step 701, the user initiates a request for an online procedure of the roaming scenario.

At step 702, an SMF sends a policy acquisition request to a PCF to request the PCF to deliver policy information.

At step 703, the PCF delivers policies, which include a related policy for accessing a dedicated network service, such as a target service offloading rule.

At step 704, the SMF receives the policies delivered by the PCF, and identifies the target service offloading rule (that is, a position-independent offloading rule) according to the DNAI of the candidate service offloading rules in the policies. Then, the SMF locally constructs a service detection rule according to the identified target service offloading rule. The constructed service detection rule can be configured to determine whether there is a dedicated network service in a user terminal packet. Here, a method for constructing the service detection rule includes: performing construction according to a reference PDN address carried by the SDF in the target service offloading rule.

At step 705, the SMF initiates a user plane establishment request carrying the service detection rule, and determines a target central UPF.

At step 706, the UPF sends an establishment complete response message to the SMF, and notifies the SMF of an installation result of the service detection rule and allocated resource information. The resource information may refer to N3 tunnel information between the ULCL UPF and the AN shown in FIG. 1.

At step 707, after a subsequent online process, the UE completes an online procedure.

At step 708, the user needs to access a dedicated network service.

At step 709, a packet of the user accessing a dedicated network reaches the target central UPF through a base station, and the target central UPF detects the UE access packet. When the destination PDN address successfully matches the reference PDN address carried by the SDF in the target service offloading rule, the UE access packet is cached and an offloading instruction is sent to the SMF. That is, in the present disclosure, the target central UPF can identify, according to the service detection rule, the packet for accessing the dedicated network service, report the packet satisfying the condition to the SMF, and cache the packet.

At step 710, the UPF reports to the SMF to indicate that the user has a request for the dedicated network service, and notifies the SMF to execute an offloading policy.

At step 711, the SMF receives a reporting message from the UPF and re-selects a secondary anchor point UPF according to the previously cached target service offloading rule. A service requiring the insertion of a PSA (the secondary anchor point) for the dedicated network is identified according to the DNAI. In this case, the original UPF will have an uplink offloading ability.

At step 712, the SMF initiates a user plane establishment request, and notifies the dedicated network UPF to allocate relevant resources required by the user to install an offloading rule.

At step 713, the SMF initiates a first user plane update request, updates the original target central UPF to the ULCL UPF to realize offloading, and forwards an offloading packet previously cached by the target central UPF to a PSA2.

At step 714, the SMF initiates a second user plane update request, and the PSA2 directs downlink traffic to the ULCL.

At step 715, the SMF notifies an I-SMF to have an update, and a notification message carries the target service offloading rule.

At step 716, the I-SMF (as a transit) notifies the UE to install the target offloading rule.

At this point, the SMF can apply for dedicated network UPF resources in real time according to the user's need.

Figure 8:
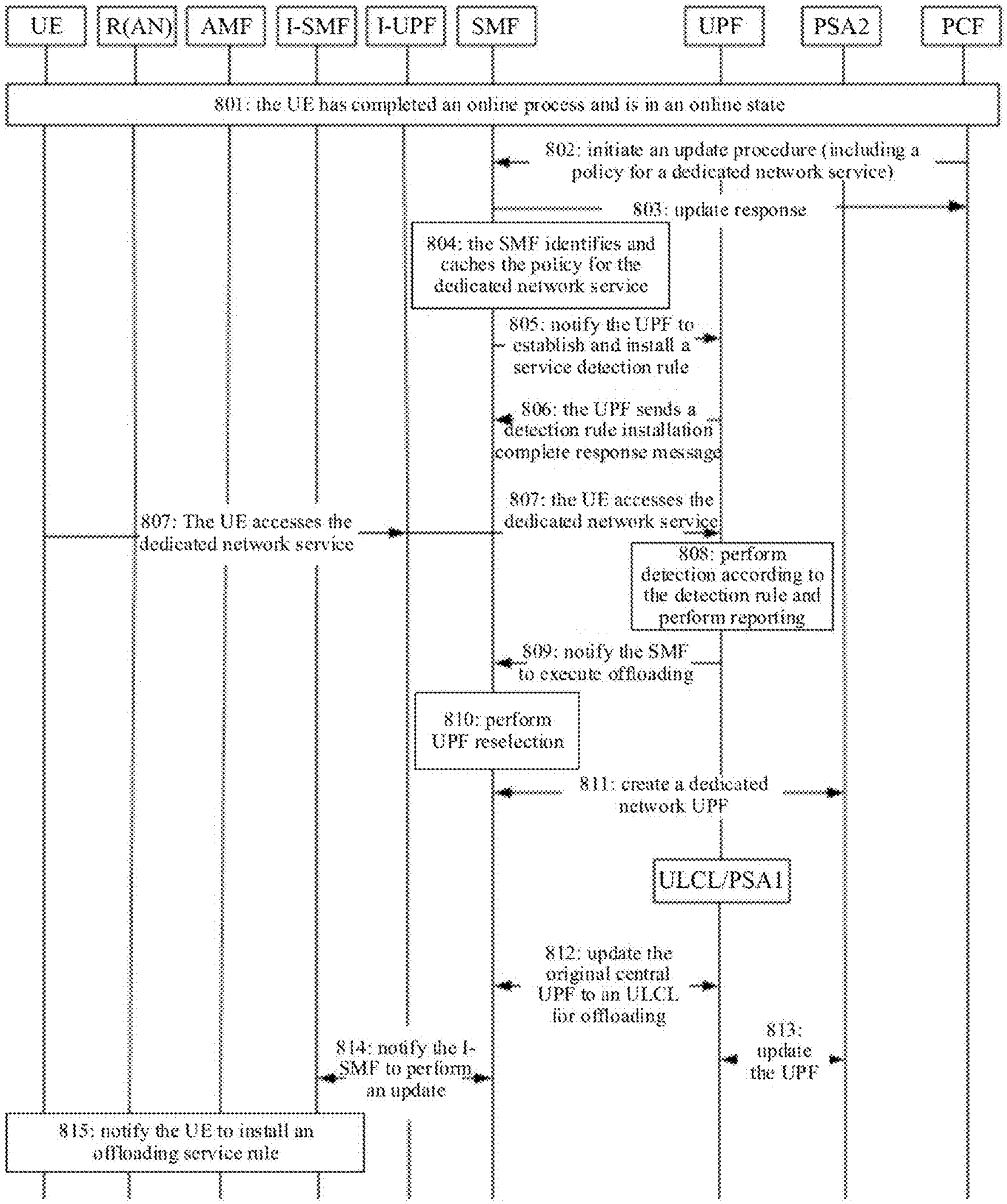
FIG. 8 is a sequence chart of a method for constructing a data offloading system in a roaming scenario according to another embodiment of the present disclosure.

As shown in FIG. 8, which illustrates an embodiment of creating a UPF-based offloading system after a user goes online in a roaming scenario, the embodiment includes but not limited to the following steps.

At step 801, the user has completed an online procedure of the roaming scenario and is in an online state.

At step 802, a PCF initiates a reverse update procedure and delivers new policies including a related policy for accessing a dedicated network service.

At step 803, an SMF sends a response message to the PCF.

At step 804, the SMF receives the policies delivered by the PCF, and identifies a target service offloading rule (that is, a position-independent offloading rule) according to a DNAI of the candidate service offloading rules in the policies. Then, the SMF locally constructs a service detection rule according to the identified target service offloading rule. The constructed service detection rule can be configured to determine whether there is a dedicated network service in a user terminal packet. Here, a method for constructing the service detection rule includes: performing construction according to a reference PDN address carried by the SDF in the target service offloading rule.

At step 805, the SMF initiates a user plane establishment request carrying the service detection rule, and determines a target central UPF.

At step 806, the UPF sends an establishment complete response message to the SMF, and notifies the SMF of an installation result of the service detection rule and allocated resource information. The resource information may refer to N3 tunnel information between the ULCL UPF and the AN shown in FIG. 1.

At step 807, the user needs to access a dedicated network service.

At step 808, a packet of the user accessing a dedicated network reaches the target central UPF through a base station, and the target central UPF detects the UE access packet. When the destination PDN address successfully matches the reference PDN address carried by the SDF in the target service offloading rule, the UE access packet is cached and an offloading instruction is sent to the SMF. That is, in the present disclosure, the target central UPF can identify, according to the service detection rule, the packet for accessing the dedicated network service, report the packet satisfying the condition to the SM, and cache the packet.

At step 809, the UPF reports to the SMF to indicate that the user has a request for the dedicated network service, and notifies the SMF to execute an offloading policy.

At step 810, the SMF receives a reporting message from the UPF and re-selects a secondary anchor point UPF according to the previously cached target service offloading rule. A service requiring the insertion of a PSA (the secondary anchor point) for the dedicated network is identified according to the DNAI. In this case, the original UPF will have an uplink offloading ability.

At step 811, the SMF initiates a user plane establishment request, and notifies the dedicated network UPF to allocate relevant resources required by the user to install an offloading rule.

At step 812, the SMF initiates a first user plane update request, updates the original target central UPF to the ULCL UPF to realize offloading, and forwards an offloading packet previously cached by the target central UPF to a PSA2.

At step 813, the SMF initiates a second user plane update request, and the PSA2 directs downlink traffic to the ULCL.

At step 814, the SMF notifies an I-SMF to have an update, and a notification message carries the target service offloading rule.

At step 815, the I-SMF notifies the UE to install the target offloading rule.

At this point, the SMF can apply for dedicated network UPF resources in real time according to the user's need.

Figure 9:
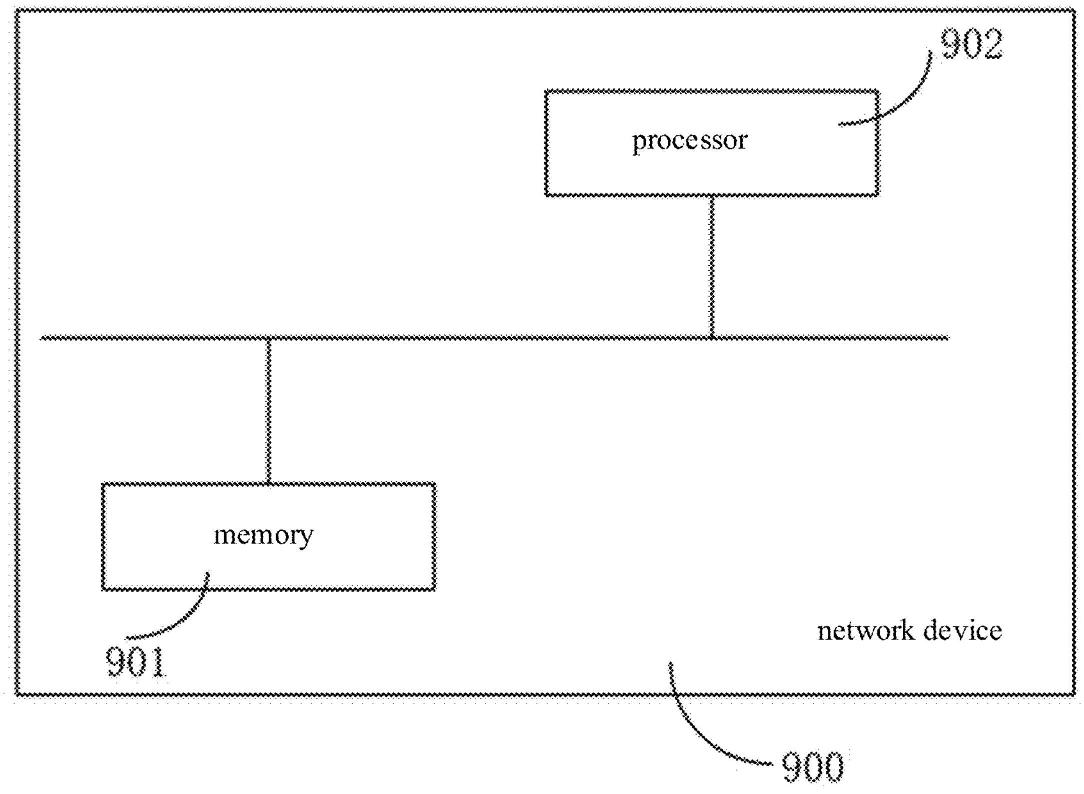
FIG. 9 is a schematic diagram of a network device according to an embodiment of the present disclosure.

As illustrated in FIG. 9, which is a schematic diagram of a terminal device according to an embodiment of the present disclosure, the terminal device 900 includes: a memory 901, a processor 902, and a computer program stored in the memory 901 and executable by the processor 902. The computer program is configured to, when running, execute the method described above.

The processor 902 and the memory 901 may be connected by a bus or by other means.

As a non-transitory computer-readable storage medium, the memory 901 may be configured to store a non-transitory software program and a non-transitory computer-executable program, for example, the method described in the embodiments of the present disclosure. The processor 902 implements the method described above by running a non-transitory software program and instructions stored in the memory 901.

The memory 901 may include a program storage area and a data storage area, where the program storage area may store an operating system and application program(s) required by at least one feature, and the data storage area can store data required for the execution of the method described above. In addition, the memory 901 may include a high-speed random access memory and a non-transitory memory, for example, at least one storage device, a flash memory device, or another non-transitory solid-state storage device. In some implementations, the memory 901 includes a memory remotely located with respect to the processor 902, and this remote memory may be connected to the terminal device 900 via a network. Examples of the above-mentioned network include, but are not limited to, Internet, intranet, local area network, mobile communication network, and combination thereof.

The non-transitory software program and the instructions required to implement the method described above are stored in the memory 901 and, when executed by at least one processor 902, cause the at least one processor to perform the method mentioned above.

An embodiment of the present disclosure further provides a computer-readable storage medium storing computer-executable instructions configured to perform the method described above.

In an embodiment, the computer-readable storage medium stores computer-executable instructions, which when executed by one or more control processors, cause the one or more control processors to implement the method described above.

The embodiments of the present disclosure have at least the following beneficial effects. The method includes acquiring candidate service offloading rules sent by a PCF, and determining a target service offloading rule is determined from the candidate service offloading rules according to a DNAI; constructing a service detection rule according to the target service offloading rule; determining a target central UPF according to the target service offloading rule, generating an establishment request according to the service detection rule, and sending the establishment request the target central UPF, where the target central UPF is configured to detect a UE access packet according to the service detection rule, and when a detection result of the UE access packet satisfies a preset condition, caching the UE access packet and send an offloading instruction to the SMF; and constructing a UPF resource-based data offloading system according to the offloading instruction. As compared with an existing technology in which a UPF-based data offloading system is established once a user goes online using a terminal device, the present disclosure controls an establishment time of the UPF-based data offloading system by detecting the UE access packet, which reduces the occurrence of idle UPF resources, and thus improves the utilization of UPF resources.

The apparatus embodiments described above are only for illustration. The units described as separate components may or may not be physically separated, that is, they may be located at one place or distributed to multiple network units. Some or all of the modules can be selected according to actual needs to achieve the purpose of the scheme of this embodiment.

It can be understood by those having ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to random access memory (RAM), read-only memory (ROM), electrically erasable programmable read-only memory (EEPROM), flash memory or other memory techniques, compact disc read-only memory (CD-ROM), digital versatile disk (DVD) or other optical disk storage, magnetic cassette, magnetic tape, magnetic disk storage or other magnetic storage devices, or any other medium that can be used to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and can include any information delivery media.

It should also be understood that various implementations provided by the embodiments of the present disclosure can be randomly combined to achieve different technical effects.

The above is a detailed description of some implementations of the present disclosure, but the present disclosure is not limited to the above-mentioned embodiments. Those of ordinary skill in the art can also make various equivalent modifications or replacements without departing from the essential of the present disclosure, and these equivalent modifications or replacements are all included in the scope defined by the claims of the present disclosure.

What is claimed is:

1. A method for constructing a data offloading system, applied to a session management function (SMF), the method comprising:

acquiring a candidate service offloading rule sent by a policy control function (PCF);

determining, according to a data network access identifier (DNAI), a target service offloading rule from the candidate service offloading rule;

constructing a service detection rule according to the target service offloading rule;

determining a target central user plane function (UPF) according to the target service offloading rule;

generating an establishment request according to the service detection rule;

sending the establishment request to the target central UPF, wherein the target central UPF is configured to identify a user equipment (UE) access packet according to the service detection rule, and in response to a detection result of the UE access packet satisfying a preset condition, cache the UE access packet and send an offloading instruction to the SMF; and constructing a UPF resource-based data offloading system according to the offloading instruction.

2. The method of claim 1, wherein constructing a service detection rule according to the target service offloading rule comprises:

determining a reference packet data network (PDN) address carried by a service data flow (SDF) in the target service offloading rule; and constructing the service detection rule according to the reference PDN address.

3. The method of claim 1, wherein the data offloading system comprises an uplink classifier (ULCL) UPF and a secondary anchor point UPF, and constructing a UPF resource-based data offloading system according to the offloading instruction comprises:

acquiring a target DNAI from the target service offloading rule according to the offloading instruction;

determining the secondary anchor point UPF according to the target DNAI;

sending a first user plane update request to the target central UPF, wherein the first user plane update request is configured to update the target central UPF to the ULCL UPF, and controlling the target central UPF to send the UE access packet to the secondary anchor point UPF; and sending a second user plane update request to the secondary anchor point UPF, wherein the second user plane update request is configured to direct a downlink of the secondary anchor point UPF to the ULCL UPF.

4. The method of claim 1, wherein acquiring a candidate service offloading rule sent by a PCF comprises:

sending a policy acquisition request to the PCF, and receiving the candidate service offloading rule sent by the PCF according to the policy acquisition request; or receiving a policy update message from the PCF, wherein the policy update message carries the candidate service offloading rule.

5. The method of claim 1, further comprising:

sending an offloading rule installation message to the UE, wherein the offloading rule installation message carries the target service offloading rule; or sending an offloading rule installation message to an intermediate SMF (I-SMF) and/or a visited SMF (V-SMF) so that the I-SMF and/or the V-SMF forward(s) the offloading rule installation message to the UE, wherein the offloading rule installation message carries the target service offloading rule.

6. A method for constructing a data offloading system, applied to a target central user plane function (UPF), the method comprising:

receiving an establishment request from a session management function (SMF), wherein the SMF is configured to acquire a candidate service offloading rule sent by a policy control function (PCF), determine, according to a data network access identifier (DNAI), a target service offloading rule from the candidate service offloading rules, construct a service detection rule according to the target service offloading rule, and generate an establishment request according to the service detection rule; and detecting a user equipment (UE) access packet according to the service detection rule, and in response to a detection result of the UE access packet satisfying a preset condition, caching the UE access packet and sending an offloading instruction to the SMF.

7. The method of claim 6, wherein detecting a UE access packet according to the service detection rule, and in response to a detection result of the UE access packet satisfying a preset condition, caching the UE access packet and sending an offloading instruction to the SMF comprise:

determining a destination packet data network (PDN) address in the UE access packet; and in response to the destination PDN address successfully matching a reference PDN address carried by a service data flow (SDF) in the target service offloading rule, caching the UE access packet and sending the offloading instruction to the SMF.

8. The method of claim 6, further comprising:

receiving a first user plane update request from the SMF, and updating to an uplink classifier (ULCL) UPF according to the first user plane update request.

9. The method of claim 8, further comprising:

sending the UE access packet to a secondary anchor point UPF.

10. A network device comprising a memory and a processor, wherein the memory stores a computer program which, when executed by the processor, causes the processor to implement the method of claim 1.

11. A non-transitory computer-readable storage medium storing a program which, when executed by a processor, causes the processor to implement the method of claim 1.

12. The network device of claim 10, wherein constructing a service detection rule according to the target service offloading rule comprises:

determining a reference packet data network (PDN) address carried by a service data flow (SDF) in the target service offloading rule; and constructing the service detection rule according to the reference PDN address.

13. The network device of claim 10, wherein the data offloading system comprises an uplink classifier (ULCL) UPF and a secondary anchor point UPF, and constructing a UPF resource-based data offloading system according to the offloading instruction comprises:

acquiring a target DNAI from the target service offloading rule according to the offloading instruction;

determining the secondary anchor point UPF according to the target DNAI;

sending a first user plane update request to the target central UPF, wherein the first user plane update request is configured to update the target central UPF to the ULCL UPF, and controlling the target central UPF to send the UE access packet to the secondary anchor point UPF; and sending a second user plane update request to the secondary anchor point UPF, wherein the second user plane update request is configured to direct a downlink of the secondary anchor point UPF to the ULCL UPF.

14. The network device of claim 10, wherein acquiring a candidate service offloading rule sent by a PCF comprises:

sending a policy acquisition request to the PCF, and receiving the candidate service offloading rule sent by the PCF according to the policy acquisition request; or receiving a policy update message from the PCF, wherein the policy update message carries the candidate service offloading rule.

15. The network device of claim 10, further comprising:

sending an offloading rule installation message to the UE, wherein the offloading rule installation message carries the target service offloading rule; or sending an offloading rule installation message to an intermediate SMF (I-SMF) and/or a visited SMF (V-SMF) so that the I-SMF and/or the V-SMF forward(s) the offloading rule installation message to the UE, wherein the offloading rule installation message carries the target service offloading rule.

16. A network device comprising a memory and a processor, wherein the memory stores a computer program which, when executed by the processor, causes the processor to implement the method of claim 6.

17. The network device of claim 16, wherein detecting a UE access packet according to the service detection rule, and in response to a detection result of the UE access packet satisfying a preset condition, caching the UE access packet and sending an offloading instruction to the SMF comprise:

determining a destination packet data network (PDN) address in the UE access packet; and in response to the destination PDN address successfully matching a reference PDN address carried by a service data flow (SDF) in the target service offloading rule, caching the UE access packet and sending the offloading instruction to the SMF.

18. The network device of claim 16, further comprising:

receiving a first user plane update request from the SMF, and updating to an uplink classifier (ULCL) UPF according to the first user plane update request.

19. The network device of claim 18, further comprising:

sending the UE access packet to a secondary anchor point UPF.

20. A non-transitory computer-readable storage medium storing a program which, when executed by a processor, causes the processor to implement the method of claim 6.

* * * * *